Feb. 13, 1968   J. B. RAMSEY   3,369,147
SAFETY CONTROL FOR AUTOMOBILE LIGHTING CIRCUITS
Filed Jan. 18, 1966   4 Sheets-Sheet 1
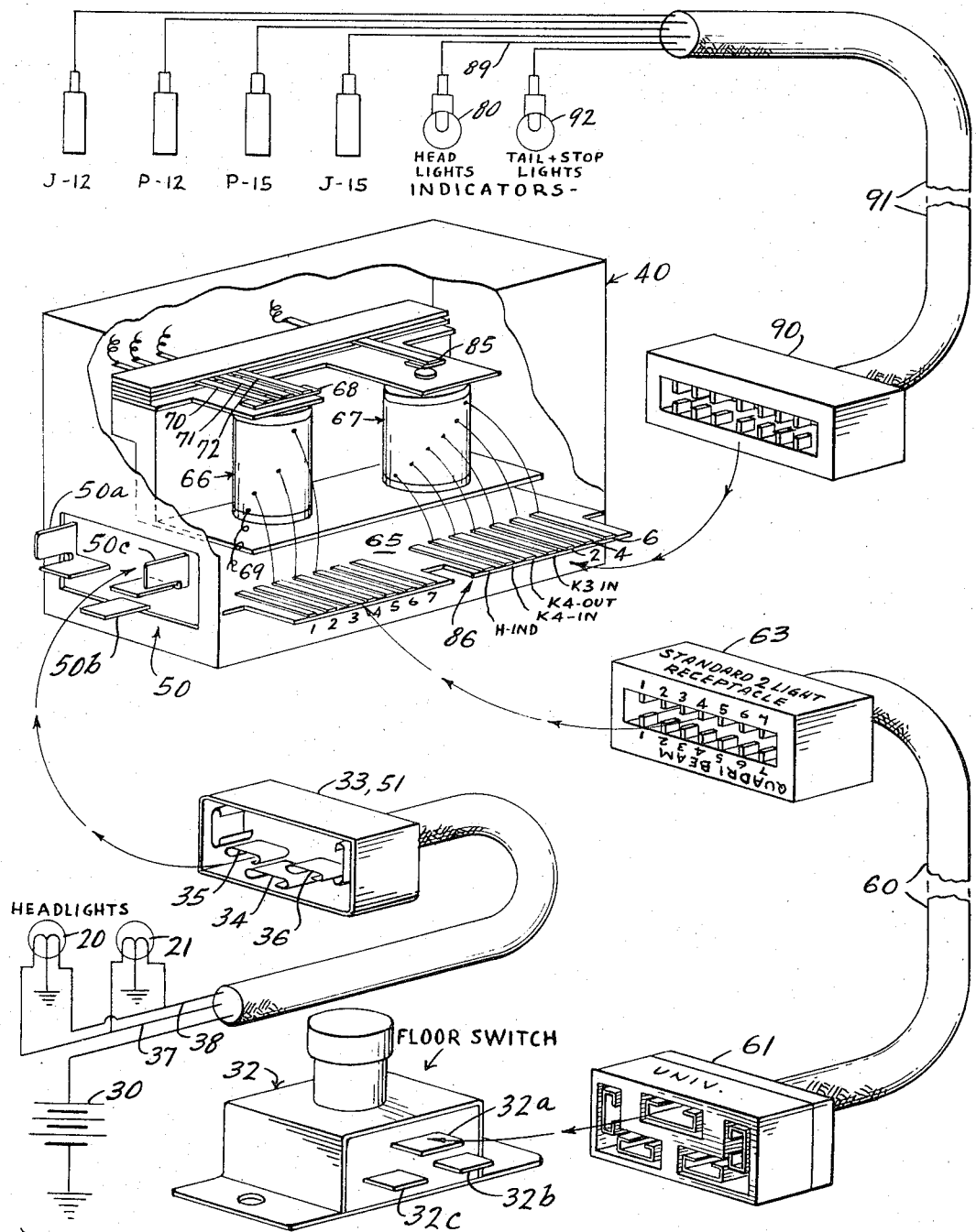
FIG-1-
INVENTOR:
JAMES BLAKE RAMSEY
BY
ATT'YS.

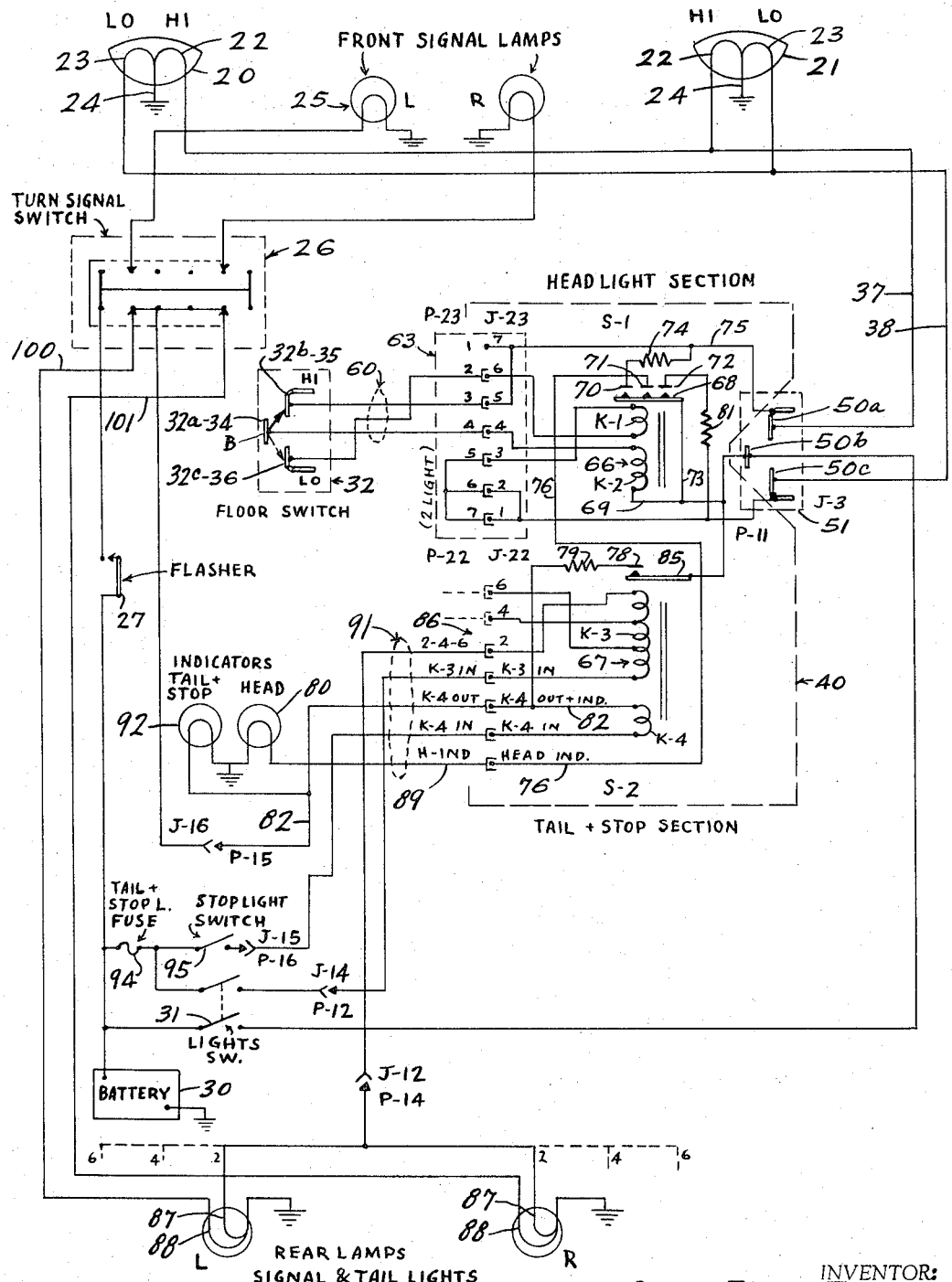

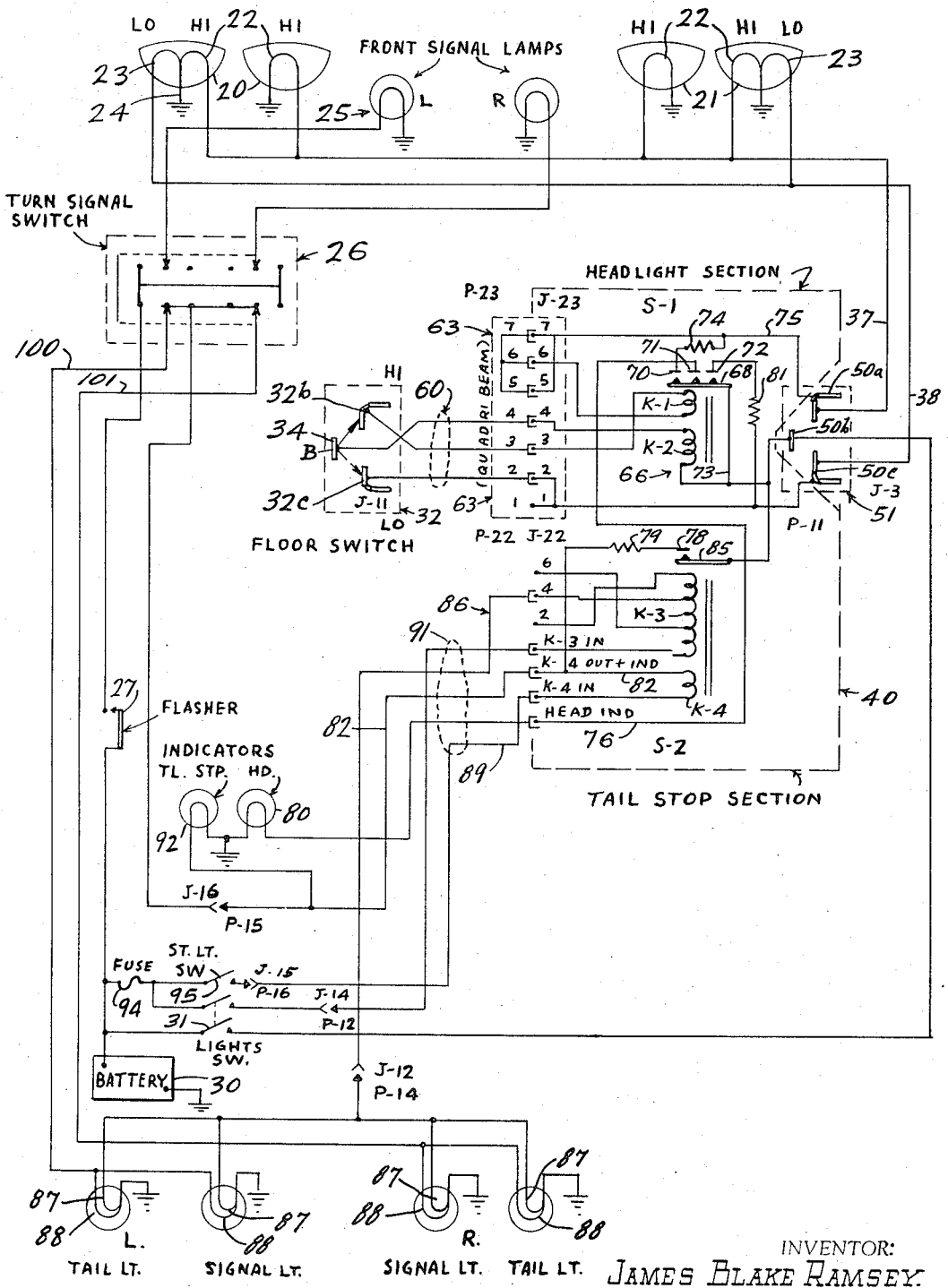

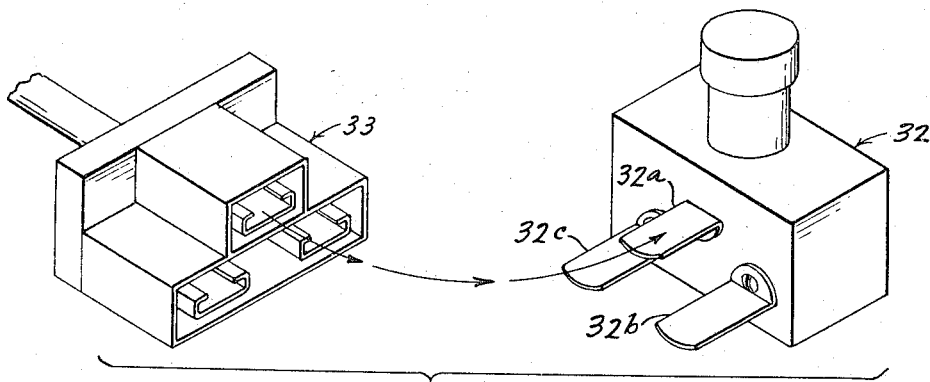
FIG-4-
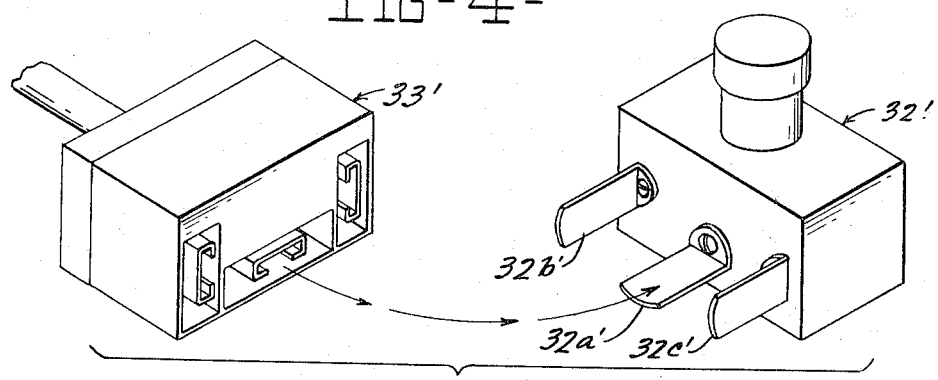
FIG-5-
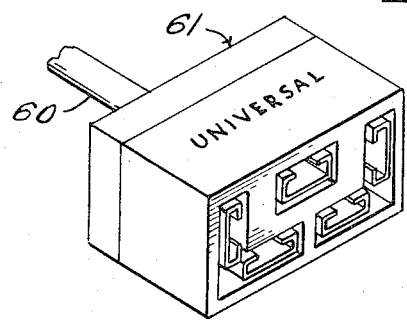
FIG-6-
INVENTOR:
JAMES BLAKE RAMSEY.
BY
ATT'YS.

United States Patent Office 3,369,147
Patented Feb. 13, 1968

3,369,147
SAFETY CONTROL FOR AUTOMOBILE
LIGHTING CIRCUITS
James Blake Ramsey, 4619 Orange Knoll Ave.,
La Canada, Calif. 91011
Filed Jan. 18, 1966, Ser. No. 521,281
8 Claims. (Cl. 315—83)

ABSTRACT OF THE DISCLOSURE

A safety device for a vehicle lighting circuit that will substitute a low beam head lamp at full intensity for an adjacent burned out high beam filament, a high beam head lamp at reduced intensity for an adjacent burned out low beam filament, and/or a stoplight filament at reduced intensity for a burned out tail lamp. The lamps for which no substitution is made burn at their original, intended intensity. The foregoing is accomplished without isolation diodes or similar devices and with only two relays. The same device is equally applicable to quadribeam and to two-lamp headlight systems, and connection to the headlight circuits is made by a simple plug connnection to the existing foot operated dimmer switch.

This invention relates to a safety control circuit for automobile lighting systems and is particularly directed to a circuit that will sense the decrease in current flow caused by failure of a lamp filament and automatically close a circuit to additional filaments on the same side of the car so that the car is never driven in an unsafely lighted condition.

The prior art in this field is replete with lamp substitution circuits requiring as many as three relays for each monitored lamp, and requiring precise adjustment of the components to accommodate the system with which they are installed. Since modern automobiles, even from the same manufacturer, may have two, four or six tail lamps, and two or four head lamps, it is apparent that the systems with which the art is familiar cannot be economically adopted universally. The present invention, on the other hand, uses only a single relay in the head lamp circuit and a single relay in the tail lamp circuit. A further advantage of the present invention is that provision is made for the simplest installation which requires only that the plug connection to the headlight "dimming" switch be removed, an attachment plug inserted in its place and the removed plug reinserted in an appropriate connector for the circuit components of the invention. This plug insertion establishes all necessary connections for the headlights, and an equally simple connection is used to install the monitoring circuit in the existing tail light wiring.

Because of the necessity for universal application to systems having either two headlights or four headlights the present invention provides a relay coil having split windings, the flux from which is additive in the case of a two headlight system, and bucking in the case of a four headlight system. The concept of maintaining a substantially constant flux when normal operational conditions prevail in either two or four headlight systems is a prime characteristic of the present invention.

The same concept of substantially constant flux stated above carries over to the tail light section of the system in which a winding on the single relay coil is split into a plurality of sub-windings equal to one-half of the number of tail light lamps used. Thus, when the system is to be used with two, four or six tail lamps, the relay in the tail light section is provided with a winding having three predetermined divisions, all of which are put in the circuit for a two tail lamp system, two of which are put into the circuit for a four tail lamp system, and only one of which is used with a circuit containing six tail lamps. Because the lamp size is standard on automobiles of American manufacture, the current flow and thus the relay flux will remain constant regardless of the system in which the invention is installed.

Many of the prior art safety circuits are pure substitution circuits in which a failure of one filament in a pair of headlights, for example, will cause both headlights to be turned off and a pair of auxiliary lights to be turned on. In many states the use of auxiliary lights is illegal. In the present invention, failure of one headlight filament will cause another filament in the same lamp to be turned on, for example, but the remaining unimpaired lamps will continue to burn. The present invention, therefore, may be said to substitute only for a defective filament without affecting any of the lamps that remain in satisfactory condition.

Many other objects and advantages of the invention will become apparent from the description of a preferred embodiment thereof, reference being had to the accompanying drawings, in which:

FIGURE 1 diagrammatically indicates connections and cabling to the existing headlight floor switch, and tail light circuits of an automotive vehicle.

FIG. 2 is a circuit diagram of an installation on a vehicle having a standard two headlight, two tail light system.

FIG. 3 is a circuit diagram of an installation on a vehicle having a "quadribeam" four headlight and four tail light system.

FIG. 4 is a somewhat diagrammatic perspective view of a floor switch and connecting receptacle of the type used by General Motors Corporation.

FIG. 5 is a somewhat diagrammatic perspective view of a floor switch and connecting receptacle of the type used by Ford Motor Company, Chrysler Corporation and American Motors Corporation.

FIG. 6 is a perspective view of a receptacle that will accept either the General Motors or Ford-Chrysler-American Motors pin connectors or floor switches.

Referring to the drawings and particularly to FIGS. 1 and 2, the present invention is shown as interposed in a conventional automotive lighting circuit for two head lamps 20 and 21 each of which has a high beam filament 22 and a low beam filament 23. The center point between the filaments is connected to a chassis ground 24. Front turn indicator lamps 25 are also provided which receive current through a turn indicator switch 26 in the usual manner, the circuit including a flasher 27.

Power to the lighting system originates in a battery 30 one side of which is grounded and the opposite side taken to the several lamps as hereinafter described. Normally the battery 30 is connected to a dash mounted "lights" switch 31 and, for the headlight circuit, to a floor switch designated generally 32. The conventional connection to the floor switch 32 is a plug and socket connection 33 with the prongs extending from the stationary part of the switch and the receptacle 33 being attached to a cable as hereinafter described. The floor switch 32 in all American automobiles is a push-push switch that puts power first on one side of the head lamp circuit and then on the other to illuminate the low beam filaments or the high beam filaments successively. In every instance the male floor switch connector comprises a center prong 32a and side prongs 32b and 32c. In the case of General Motors automobiles the prongs of the switch are arranged as shown in FIG. 4 on each corner of a triangle with the pins or prongs in parallel planes. In the case of Ford, Chrysler and American Motors cars the prongs or pins are arranged as shown in FIG. 5 with the center pin disposed at right angles to the side pins which face each other on opposite sides of the connector. The normal plugs for these floor switches are shown in FIGS. 4 and 5. By reason of the symmetrical disposition of these conventional parts it becomes possible to construct a single receptacle which will accept either set of prongs or pins. Such a universal receptacle is shown in FIG. 6. In the position shown, as in FIG. 6, the universal receptacle may be fitted directly to the switch 32 (FIG. 4) for electrical connection thereto; and when it is desired that it be fitted to the switch 32' (FIG. 5) it is merely necessary to invert the receptacle in a bottom up manner to have the connector prongs be properly aligned therewith.

The plug connector 33 which is normally received over the prongs of the foot switch 32 has a center element 34 to which power is supplied from the vehicle battery 30 and side elements 35 and 36 connected to conductors 37 and 38 running to the vehicle headlights. The conductor 35 is designated as running to the "high beam" filaments 22 and the second conductor 36 is shown as running to the "low beam" filaments 23.

In accordance with the present invention, the normal plug connector 33 is removed from the foot switch and is plugged over the prongs of a male plug 50 built in to a circuit box 40. In FIGS. 2 and 3 of the drawings the male connector 50 and the receptacle fitted over it are designated 51. The prongs of this male connector are designated 50a, 50b and 50c in the circuit diagram. The center prong 50b thus serves as a power input to the circuit of the present invention, while prong 50a is connected to the high beam filaments and prong 50c is connected to the low beam filaments.

On the opposite side of the circuit box as shown in FIG. 1, a three wire cable 60 is indicated which has a receptacle 61 at one end to be inserted over the prongs of the floor switch 32. The universal form of receptacle is described above. The cable 60 at its end adjacent the circuit box is provided with a seven element socket connector 63. The socket connector elements are numbered 1 to 7 on the face of the stationary connector which constitute flat pins formed on or carried by a circuit board 65 and the two sides of the socket element of the connector are labeled "Standard 2 Light" on one side and "Quadribeam" on the other side. When used with the "Standard 2 Light" vehicle lighting system as shown in FIG. 2, the pins and sockets of the connector 63 are matched 1 to 7, 2 to 6, 3 to 5, etc. as indicated. When used with a "Quadribeam" system having four head lamps as shown in FIG. 3 the connector 63 is turned over so that the pins and sockets are matched 1 to 1, 2 to 2, 3 to 3, etc. This system will be described in detail subsequently.

The circuit box 40 contains two relays designated generally 66 and 67. Relay 66 has windings $K_1$ and $K_2$ disposed around a common core and its armature is shown diagrammatically at 68. Coil $K_1$ is connected to pins 3 and 6 of the connector 63 and coil $K_2$ is connected at one end to pin 4 of the same connector and at the other end by an internal power lead or conductor 69 to the prong 50b so that power from battery 30 enters the relay circuit at this point.

The second relay 67 is in the tail light circuit and will be subsequently described.

The armature 68 of relay 66 carries three contact sets comprising usual stationary and movable contacts, and these sets are designated 70, 71 and 72. The armature body itself is connected to the power lead 69 by conductor 73 so that power is applied to all of the movable contacts of the sets 70, 71, 72 simultaneously.

The stationary contact of the contact set 70 is connected to a dropping resistor 74 and thence to a conductor 75 leading to prong 50a of the headlight connection and thence via conductor 37 to the high beam filaments. The high beam conductor 75 is also connected to prongs 7 and 5 of connector 63 and thus by cable 60 to the high beam prong 32b of the floor switch 32. Whenever a connection to the high beam filaments 22 is established only through contact set 70 the high beam filaments burn at a reduced brilliance due to the voltage drop across resistor 74 and the lowered voltage applied to the filaments. This condition occurs when one of the low beam filaments fails as later described.

The contact set 71 is connected to a lead 76 extending to an indicator circuit and thus to a head lamp condition indicator 80 which may comprise an incandescent lamp or similar device by which the driver's attention is directed to the fact that relay 66 has relaxed and closed its contacts in response to a failure in the headlight circuit as more fully described hereinafter.

The contact set 72 is connected through a small stabilizing resistor 81 of only a fraction (.25) of an ohm to pins 1 and 2 of the connector 63 and also to the low beam filament circuit via prong 50c of male connector 50, and side pin 36 of connector 33 (FIG. 1).

Turning now to the structure of the tail light control circuit and referring specifically to FIGS. 1 and 2, the relay 67 is provided with two windings $K_3$ and $K_4$. $K_3$ is a tapped winding and, together with $K_4$, surrounds a common core and actuates a single armature 85. Winding $K_4$ is connected in the stoplight circuit as hereinafter described, and winding $K_3$ is connected in the tail light circuit. The windings of $K_3$ are tapped in three predetermined sections and the taps are connected to pins 2, 4 and 6 of a series of stationary contacts designated generally 86 carried by circuit board 65. The tail light filaments are designated 87 and the lamps containing these filaments also contain stoplight filaments 88. In the common practice of present automobiles the tail light filaments draw less current and burn at lower brilliance than the stoplight filaments. Further, the usual practice is to energize the stoplight filaments as turn signals.

In the series of contacts 86, in addition to the pins for the tapped windings of $K_3$, a pin is also provided for the common end of $K_3$ and for each end of winding $K_4$ designated ($K_4$ In and $K_4$ Out) as well as a separate pin connected to a conductor 89 leading to conductor 76 from the contact set 71 in the headlight section and, by its associated plug, to the head lamp indicator 80.

The series of stationary contacts 86 receives a multiple plug 90 thereover and a cable 91 extends from the plug 90 as seen in FIG. 1.

In addition to the conductor 89 leading to the headlight indicator 80, cable 91 contains conductors leading to a tail-stop indicator light 92 and to jacks J–12 and J–15 as well as to plugs P–12 and P–15. These jacks and plugs fit into connectors in the existing tail and stoplight circuits if the present invention is to be installed in an automobile previously manufactured. However, in the event that the present invention is installed as original equipment there would be no need to use the jacks and plugs above-mentioned.

The common side of coil $K_3$ is taken to plug P–12 which fits into a jack designated J–14 on the drawings and which connects to an appropriate terminal on the vehicle "lights" switch and from this switch through an appropriate fuse 94 to the battery 30. A connection to the tail lights is thus made from the battery through the "lights" switch, through coil $K_3$ and out of coil $K_3$ to conector J–12. Jack J–12 is connected to plug P–14 which connects all of the tail light filaments in parallel. If two tail lights are used as shown in FIG. 2 all three sections of the tapped winding are placed in series and the connection is made to the pin marked "2" on the series of contacts 86. If the system is provided with four tail lamps as indicated in FIG. 3, then the connection will be made to the pin marked "4" on the series of contacts 86. Similarly, if there are six tail lamps on the vehicle the connection will be made to the pin marked "6" on the series of contacts 86. These selected connections are indicated in dotted lines in FIG. 2. In the case of a system having four tail lamps, two of the sections of coil $K_3$ are put in series. In the case of a system having six tail lamps only one-third of the windings of coil $K_3$ are utilized.

The stoplight circuit which was normally established between plug P–16 and jack J–16 as shown in FIG. 2 is interrupted and jack J–15 of cable 91 is fitted over plug P–16 and plug P–15 of cable 91 is put into jack J–16 so that coil $K_4$ is now interposed in the stoplight circuit. The vehicle stoplight switch is indicated at 95 in FIG. 2 and the circuit to the stoplights is completed from jack J–16 through the turn signal switch 26 and an appropriate connector bar therein to conductors 100 and 101 leading to the stoplight filaments 88 in the tail lamps. These stoplight filaments, of course, serve the normal function of turn signal indicators at the rear of the car when the turn switch 26 is actuated manually by the driver and all stoplight filaments are energized upon closure of the stoplight switch 95.

It will thus be seen that in the tail-stop section of the circuit according to the present invention relay 67 is a multirange single pole single throw, current sensitive, series-connected, tapped coil relay which maintains a constant magnetic pull on the armature 85 for each range for the given predetermined load whether the vehicle has two, four or six stoplights. Relay 67 has an additional coil, $K_4$, that is series connected in the stoplight circuit, the function of which is to provide separation between the tail and stoplight circuits.

Because the tail light filaments 87 of the same type have the same current demand (usually one-half ampere each) all of the turns of coil $K_3$ are used for the smallest number of lamps (usually two), the reduced number of turns of the next tap will take care of twice as many lamps (four), while maintaining the same magnetic pull, and the further reduced number of turns of the next tap is for three times as many lamps (six) and maintains the same magnetic pull as two lamps when connected to the full number of turns of coil $K_3$.

The armature 85 of relay 67 may be provided with an adjusting spring so that its sensitivity is adjustable and the relay may be made to relax when the current flow is reduced by one-half, one-fourth, or one-third of the normal predetermined current. Thus, in a four tail-stop lamp system the relay may be adjusted to close to indicate the failure of two or more tail lamps. (Flux reduction of 50%. It is preferred not to have the relay close upon failure of a single tail lamp in the event that four are used because the driver still has illumination on each side of the rear of the car. In the system where six tail lamps are used, three on each side of the rear of the car, two of the lamps can fail without serious results, but the failure of a third might cause one side of the car to be dark. Therefore, the present invention includes adjustment of relay 67 to close upon the 50% reduction in flux which would accompany failure of three or more lights.

In the event of failure of the predetermined number of tail lights which results in lowering the flux in relay 67 to a point that its armature 85 will no longer stay open, the armature 85 closes against a stationary contact 78 to complete an emergency shunt circuit between pin 50$b$ of connector 50 (see FIG. 2) through a dropping resistor 79 to a conductor 82 to the upper side of coil $K_4$ and thus to the stoplight circuit through plug P–15 and jack J–16, through the turn signal switch 26 and to the stoplight filaments. By reason of the insertion of dropping resistor 79 the stoplight filaments 88 will thus burn continuously at reduced brilliance. At the same time, a parallel circuit near plug P–15 is established to the tail-stop indicator lamp 92 and to ground beyond the indicator lamp. The operator is thus alerted that a predetermined number of tail lights have failed and that the rear of his car is being illuminated by the reduced-brilliance stoplights. Under no circumstances, of course, can the driver proceed with all of the tail lights on one side of his car extinguished.

If the operator actuates the normal stoplight switch 95 the circuit to the stoplight filaments that has been established through the dropping resistor 79 is bypassed and the stoplights will burn at full brilliance as in normal operation whether they are being used as emergency tail lights or not. This circuit is established from the stoplight switch through plug P–16, jack J–15, coil $K_4$ directly to plug P–15 and jack J–16, as before. The stoplight filaments also continue to function normally as turn-signal lamps at full brilliance.

In day or night operation whenever the brakes are applied and stop switch 95 is closed, the tail-stop indicator 92 burns at full brilliance indicating that the brakes are in use. This gives the driver a further indication that the stoplight filaments are normal and that he is getting power to the rear of the car where needed.

The above operations take place assuming that the fuse 94 in the tail-stop circuit is intact. If the fuse is intact the current for the tail lights that are still operable will still flow through coil $K_3$ as before and, in addition, the emergency current from prong 50$b$ in the headlight section flows through the above-mentioned shunt circuit established by armature 85 and contact 78 in relay 67 and through the dropping resistor. In the event of fuse failure, which would result in the entire rear of the car being without tail lights, the emergency shunt circuit will illuminate the stoplight filaments at reduced brilliance and will indicate to the operator that this has been done. This shunt circuit as above noted takes power from the headlight circuit at pin 50$b$, through armature 85, contact 78, resistor 79, conductor 82, to plug P–15, jack J–16, turn signal switch 26 and conductors 100 and 101 to stoplight filaments 88.

As previously described, relay 66 has separate windings $K_1$ and $K_2$ which are used to maintain a constant magnetic force on the armature 68 under the various conditions that can be encountered in present lighting circuits. In the present commercially used quadribeam circuit, four lights are illuminated at the same time when in the high position. Each of these lights draws approximately 3 amperes, making a total current flow in the headlight circuit of 12 amperes. When the quadribeam system (see FIG. 3) is in the low position two headlights are illuminated, and each of them draws approximately 4 amperes making a total of 8 amperes in the headlight circuit. In the standard two headlight circuit the normal lamps are provided with "high beam" filaments that draw approximately 4 amperes each making a total of 8 amperes in the circuit when the foot switch is connected for the high beam position. In the low beam position in the standard two headlight circuit two lights are illuminated that draw approximately 3 amperes each making a total of 6 amperes.

Both coils $K_1$ and $K_2$ are wound around the core in the same direction, with $K_1$ having fewer turns. Coil $K_2$ is used in all ranges, whether the headlight system is drawing 6 amperes, 8 amperes or 12 amperes and is fed in the same direction for all ranges. This coil is used alone for the conditions in which the headlight circuits draw 8 amperes (high beam on the standard two headlight system and low beam on the quadribeam headlight system). For the high range of the current that occurs when a quadribeam system is in the high beam position so that 12 amperes is flowing in the headlight circuit, coil $K_1$ is used in series with coil $K_2$ but is fed in the opposite direction so that the flux generated thereby will buck the flux of $K_2$. The turns ratio between the two coils is such that 12 amperes flowing through $K_2$ in the normal direction and through $K_1$ in the opposite direction produces a magnetic flux in the relay equal to that produced by 8 amperes through coil $K_2$ alone. When the headlight circuit would be drawing normally 6 amperes as in the low beam position of a standard headlight circuit, the current is lower and coil $K_1$ is used in series with coil $K_2$ and is fed in the same direction as $K_2$. Thus the 6 amperes flowing through both coils $K_1$ and $K_2$ in the normal direction produces a magnetic flux in the relay equal to that of 8 amperes flowing in coil $K_2$ alone. The relay will have, therefore, equal sensitivity in all ranges. The relay sensitivity is such that a flux reduction of one-fourth will cause it to close. Thus failure or extinguishment of one lamp in the quadribeam high position will cause relay actuation. Similarly, a loss of one lamp in the quadribeam low position or in either position for the standard two headlight circuits will cause a drop of 50 percent of the flux flowing in the relay core and the relay will thus drop out and contacts 70, 71 and 72 will be closed.

While relay 66 is a normally closed relay and is held open by normal current flowing in the headlight circuits its closure will establish a shunt circuit on the high beam side from contact 50b through contact set 70, through dropping resistor 74 to conductor 75 and prong 50a to the high beam filaments. A second shunt circuit is provided when the relay is closed from prong 50b through contact set 72 back through resistor 81 to the conductor connected to prong 50c and thence to the low beam filaments. It will thus be seen that the shunt filament substitution circuits are very short and are entirely within the unit itself.

The operation of the quadribeam system shown in FIG. 3, in which reference numerals designating the low and high beam filaments of the headlamps and other common parts are used in the same manner as those designating similar parts in FIG. 2, is as follows: assume that the floor switch 32 is in "low" position and that all of the head lamps are functioning normally. When the vehicle "lights" switch 31 is closed, current (8 amperes) enters from the battery 30 through the center prong 50b of connector 51 through coil $K_2$ to pin 4 of the multiple pin connector 63 thence to the floor switch, center contact and out to the side contact 32c and back to pin 2 of connector 63 and to pin 50c of connector 51, thence via conductor 38 to the low beam filaments 23 of the headlights.

If both headlights are normal, the current flow through coil $K_2$ is normal and generates sufficient flux to hold the armature 68 of relay 66 open so that contact sets 70, 71 and 72 are open and both of the shunt circuits above-mentioned are disabled and the head lamp indicator 80 will be dark.

A decrease in current flow of one-fourth or more through the relay coils caused by an open head lamp filament will cause relay 66 to relax. If one of the head lamp filaments burns out, the current flow in the head lamp circuit would be reduced to one-half of normal. The current will continue to flow to the remaining low beam head lamp through coil $K_2$ and the vehicle floor switch in the normal manner. However, when relay 66 relaxes and closes its contacts, a shunt circuit is set up through the contact set 70 and through dropping resistor 74 and conductor 75 to pin 50a of connector 51 and thence to conductor 37 to the high beam filaments. This will apply a reduced voltage to the high beam filaments due to the dropping resistance of resistor 74. Thus the current for the remaining satisfactory low beam lamp continues to flow through coil $K_2$ while all of the current at reduced voltage flows through the shunt circuit described above to the four high beam head lamps. At the same time, the indicator 80 is illuminated through contact set 71 notifying the vehicle operator that there has been a failure in the head lamp circuit. At no time does the vehicle proceed with only one head lamp illuminated which is a dangerous condition very commonly encountered in highway driving.

Following with the description of the quadribeam system shown in FIGURE 3, and assuming that the floor switch is in the high position, the circuit to the high beam filaments is as follows. Power enters the system at pin 50b of connector 51, flows through coil $K_2$ to pin 4 of connector 63 to the center pin 34 of the floor switch to the side pin 32b and back to pin 3 of connector 63 and thence to the top of coil $K_1$. From the bottom of $K_1$ the circuit continues to pins 6 and 7 (jumpered in the plug of connector 63) to conductor 75 to pin 50a and thence by conductor 37 to the high beam filaments. Under these circumstances, 12 amperes is flowing in coils $K_1$ and $K_2$, but the connection to coil $K_1$ is such that its flux bucks the flux of $K_2$ and the magnetic effect on armature 68 is the same as the effect produced by 8 amperes flowing in coil $K_2$ alone.

A decrease in current flow of one-fourth or more caused by opening one of the head lamp filaments, or for any other reason, will cause relay 66 to relax. If it be assumed that one of the head lamps has failed, the current flow through relay 66 will be reduced by one-fourth and the decease in flux resulting therefrom will cause relay 66 to relax and close the contact sets 70, 71 and 72. This completes both shunt circuits above-mentioned and also completes the circuit to the indicator 80. The current to the remaining three head lamps that are intact continues to follow the path of least resistance which is through coil $K_2$, the floor switch and coil $K_1$ in spite of the insertion of resistance 74 in a parallel path and the intact high beam filaments will continue to burn at full brilliance. However, the shunt circuit to the low beam head lamps through contact set 72 to pin 50c of connector 51 is now established and both low beam head lamps will burn at nearly full brilliance. (Resistor 81 is chosen of small magnitude and is for the purpose of stabilizing operation. Closure of contact set 71, as before, energizes the circuit to the head lamp indicator 80 to notify the driver that one of the high beam filaments has failed and that the lamp containing such filament should be replaced.

Following the circuits to the head lamps in the standard two lamp circuit shown in FIG. 2, the connections of plug 63 have been reversed by turning the plug over physically and inserting it in the opposite direction on the pins of this connector so that the pins and sockets are now matched 1–7, 2–6, 3–5, etc. as shown in FIG. 2. If the floor switch of the standard two head lamp circuit is in the "high" position the circuit is from pin 50b through conductor 69, coil $K_2$ to pin 4 of connector 63 and thence through cable 60 to the center pin 32a of the floor switch and thence to the side pin 32b of this connector and back to pin 5 of connector 63. Pins 5 and 7 of the connector 63 are jumpered, as shown in the circuit diagram, so that the current flows through conductor 75 to pin 50a of connector 51 and into conductor 37 to the high beam filaments. In the event of failure of one of the high beam filaments, the current flow is reduced by one-half in coil $K_2$. Thus relay 68 will relax and contacts 70, 71 and 72 will close. The circuit to the high beam filament that remains intact will flow through the circuit above set forth and this filament will remain lighted. However, closure of the contact set 72 establishes a shunt circuit from power conductor 69 through the contact set and back immediately to the conductor connected to pin 50c and conductor 38 leading to the low beam filaments. Both low beam filaments are thus illuminated so that, again, the driver will have headlights on both sides of the car and his car is in a safe condition. At the same time, closure of contact set 71 causes the headlight indicator 80 to become illuminated, notifying the driver that his headlights are operating in an emergency condition and that one lamp should be replaced.

In the standard two headlight system where the low position of the headlights is established by the floor switch, the circuit may be traced in FIGURE 2 as follows. Current from the battery enters past the "lights" switch 31 through pin 50b of connector 51 through coil $K_2$ to pin 4, through cable 60 to the center pin 32a of the floor switch and to the side pin 32c thereof and back to pins 2–6 of connector 63. Thence, current flows to the bottom of coil $K_1$ so that the flux of this coil is added to the flux of coil $K_2$. From the top of coil $K_1$ the connection is established through pin 3 of connector 63 which are jumpered in the plug with sockets 5, 6 and 7. The current then flows to pin 50c and to conductor 38 to the low beam filaments. Since the current flow is only 6 amperes under normal conditions the flux of both coils $K_1$ and $K_2$ must be added together for the relay 66 to remain in its energized position and to hold the armature 68 open. When one of the low beam filaments fails the flux in coils $K_1$ and $K_2$ will be reduced by one-half and as the relay relaxes armature 68 will close contacts 70, 71 and 72. Current will continue to flow to the remaining operative low beam filament through the circuit above traced. However, closure of contact set 70 will establish a short shunt connection from power conductor 69 through contact set 70 through the dropping resistor 74 to conductor 75, pin 50a to conductor 37 to the high beam filaments. The two high beam filaments will then burn at reduced brilliance. If the high beam filaments were simply substituted for the low beam filaments under these conditions, a blinding light might be established which would be annoying to oncoming drivers. However, the reduced brilliance resulting from the insertion of resistor 74 in the circuit gives ample illumination on both sides of the front of the car without blinding such oncoming drivers.

It will be seen that complete isolation is maintained between the indicator circuits, the low beam and high beam circuits above set forth, and that no undesired interconnection can be established.

What I claim is:

1. In a safety device for an automobile lighting system having sets of lighting filaments comprising at least two low beam head lamp filaments and at least two high beam head lamp filaments of different resistances so that the normal total current flow in the lighting circuit varies depending on which of said filament sets is connected, and having an operator controlled switch to select either of said filament sets for normal operation; the improvement comprising a relay coil having a split winding providing two relay winding sections around a common core, means to connect only one of said winding sections in series with the filament set having a first predetermined current consumption, and to connect both of said winding sections in series with the filament set having a second predetermined current consumption, said connections being so arranged that the total flux produced by said winding sections is substantially constant for normal operation of either of said sets of filaments, an armature associated with said relay, a plurality of normally closed relay contact sets associated with said armature and held open by normal constant flux in said relay coil and closed upon a predetermined reduction in flux in said relay coil, and separate shunt circuits to each of said head lamp filament sets established upon closure of said relay contact sets, whereby shunt circuits are established around said relay coil to both head lamp filament sets.

2. The improvement defined in claim 1 in which said one of the winding sections is connected in series with the filament set having the higher current consumption, and both of said winding sections are connected in series with the filament set having the lower current consumption, the flux from said winding sections being additive.

3. The improvement defined in claim 1 in which said one of the winding sections is connected in series with the filament set having the lower current consumption, and both of said winding sections are connected in series with the filament set having the higher current consumption, the flux from one of said winding sections bucking the flux from the other of said winding sections.

4. The improvement defined in claim 1 and a dropping resistor in that one of said shunt circuits leading to said high beam head lamps to reduce the light intensity therefrom when energized through said shunt circuit.

5. In a safety device as defined in claim 1, an indicator means, and a separate shunt circuit to energize said indicator means, said last named circuit being established upon movement of said armature to circuit-closed position.

6. A safety device in accordance with claim 1 and a second relay having a coil comprising at least one winding tapped in a plurality of equal coil sections equal to one-half the number of tail lamps on the vehicle, whereby said coil will produce a substantially constant flux when connected in series with tail light circuits having a plurality of tail lamps equal to twice the number of winding sections, the number of winding sections used in series in said tail light circuit being inversely related to the number of tail lamps, an armature associated with said second relay and having a normally closed contact set associated therewith and held open by normal constant flux resulting from normal current flow in said coil and closed upon a predetermined reduction in current flow therein resulting from failure of one or more of said tail lamps, said tail lamps containing additional filaments of higher current consumption normally acting as stoplight filaments in said vehicle lighting circuit, a second shunt circuit around said second relay coil to said additional filaments established upon closure of said last-named armature, and a dropping resistor in said last-mentioned shunt circuit to reduce the brilliance of illumination of said additional filaments when energized through said second shunt circuit.

7. A safety device in accordance with claim 1 and a second relay having a coil comprising at least one winding tapped thirds whereby said coil will produce a substantially constant flux when connected in series in tail light circuits having two, four or six tail lamps of similar current consumption and all of the turns of said winding are used with tail lamp circuits containing two lamps, two-thirds of the turns of said tapped winding are used with tail lamp circuits containing four lamps, and one-third of the turns of said tapped winding are in series in said tail lamp circuits containing six lamps, an armature associated with said second relay and having a normally closed contact set associated therewith and held open by normal constant flux resulting from normal current flow in said coil and closed upon a predetermined reduction in current flow therein, said tail lamps containing additional filaments of higher current consumption normally acting as stoplight filaments in said vehicle lighting circuit, a second shunt circuit around said second relay coil to said additional filaments established upon closure of said last-named armature, and a dropping resistor in said last-mentioned shunt circuit to reduce the brilliance of illumination of said additional filaments when energized through said second shunt circuit.

8. A safety device for an automobile lighting system having a separable plug connector by which power is taken from a vehicle battery to first and second vehicle lighting circuits normally drawing current at first and second predetermined levels, said safety device including an insert plug adapted to be inserted into one part of said separable connector and to receive the other part of said separable connector to establish a power circuit and first and second light control circuits in said safety device, a relay in said safety device having a coil, and an armature, said relay coil having a split winding one section of which is in series in said first light control circuit and both sections of which are in series in said second light control circuit, said armature being moved to a circuit-open position when both coil windings are energized normally and biased to circuit-closed position when said windings carry less than a predetermined current, and shunt circuits established around said relay coil from said power source to both said first and second lighting circuits upon movement of said armature to circuit-closed position.

References Cited

UNITED STATES PATENTS

| | | | |
|---|---|---|---|
| 1,972,514 | 9/1934 | Engelhard et al. | 315—77 |
| 2,101,489 | 12/1937 | Black | 315—83 |
| 3,250,950 | 5/1966 | Reiche | 315—77 |

JAMES W. LAWRENCE, *Primary Examiner.*

R. JUDD, *Assistant Examiner.*